United States Patent [19]

Ruyak

[11] 4,325,914

[45] Apr. 20, 1982

[54] LABORATORY PRESSURE VESSEL

[75] Inventor: Robert F. Ruyak, Erie, Pa.

[73] Assignee: Autoclave Engineers, Inc., Erie, Pa.

[21] Appl. No.: 182,984

[22] Filed: Sep. 2, 1980

[51] Int. Cl.³ .......................... B01L 3/00; B01L 3/16; B65D 53/00; B65D 45/00
[52] U.S. Cl. .................................. 422/102; 220/233; 220/315; 292/256.6; 422/130; 422/242
[58] Field of Search ..................... 292/256.6; 422/102, 422/130, 242; 220/233, 315

[56] References Cited

U.S. PATENT DOCUMENTS

| 2,436,407 | 2/1948 | Stephens | 292/256.6 X |
| 2,645,513 | 7/1953 | Sterrett | 292/256.6 |
| 3,223,492 | 12/1965 | Geitz | 422/242 X |
| 3,298,794 | 1/1967 | Mikesell et al. | 422/242 |
| 3,986,635 | 10/1976 | Niskin | 292/256.6 X |
| 4,192,849 | 3/1980 | Scheubeck et al. | 422/242 |
| 4,248,831 | 2/1981 | Hughes | 422/242 X |
| 4,297,323 | 10/1981 | Tetzlaff et al. | 422/242 X |

FOREIGN PATENT DOCUMENTS 946580  7/1956  Fed. Rep. of Germany.

Primary Examiner—Barry S. Richman
Attorney, Agent, or Firm—Webb, Burden, Robinson & Webb

[57] ABSTRACT

A laboratory pressure vessel having a cover plug suspended on a platform and extending therebelow. A vessel body is arranged to be moved into sliding engagement with the cover plug below the platform. Grooves in the walls of the cover plug and vessel body together define a toroidal space and a flexible element is arranged to be inserted into said toroidal space to secure the cover plug and body together.

7 Claims, 3 Drawing Figures

LABORATORY PRESSURE VESSEL

BACKGROUND

This application relates to a unique laboratory pressure vessel or autoclave especially suitable for laboratory experimentation. The laboratory pressure vessel provides a wide variety of programmable conditions of use, for example, pressures up to 2,000 psi, temperatures up to 450° F. (230° C.) and agitation at speeds up to 3000 rpm. Pressure, temperature and agitation conditions are variables that affect the rate and nature of most chemical reactions. Thus the unique autoclave described herein is especially suitable for laboratory study of chemical processes and the optimization thereof. It is a feature of the autoclave according to this invention that it is easily assembled and disassembled and easily accessed for setting up the next run and/or cleaning up after a run. It is unnecessary to disconnect pressure conduit, thermowell connections, and agitating devices in order to open the vessel. Further, laborious bolting and unbolting of the cover and the body are unnecessary.

SUMMARY OF THE INVENTION

Briefly, according to this invention, there is provided a laboratory pressure vessel or autoclave. The autoclave is interconnected with support structures which include a platform or countertop-type surface held above the floor by standards. The platform has an opening therein. The autoclave or pressure vessel cover plug is permanently secured to the platform and has a portion extending downwardly below the platform through the opening. The cover plug is secured to the platform so that it does not slide or rotate. The cover plug is provided with a plurality of utility passages therein. Utility passages are openings through the cover which enable the vessel to be placed in communication, for example, with sources of pressurizing gases or with an exhaust reservoir. The openings are also provided as locations for rupture discs which are safety devices. The openings are used to communicate, for example, with a thermowell in which a thermocouple or other temperature sensing apparatus may be inserted to measure the temperature of the contents of the closed vessel. Finally, the pressure vessel cover plug has an opening through which the shaft driving the agitation device, for example an impeller or paddle, may be passed.

Because the cover plug is fixed relative to the platform, the various utilities may be mounted relative to the platform and permanently connected to the cover of the vessel. The portion of the pressure vessel cover extending downwardly below the platform includes an outer circular cylindrical surface.

The pressure vessel body comprises circular cylindrical side walls and a bottom. It has an open end being the only opening therein. The opening is arranged to fit over a portion of the pressure vessel cover plug extending downwardly below the platform. The inner cylindrical surface of the cylindrical walls of the pressure vessel slide over the outer cylindrical surface previously described as part of the pressure vessel cover plug. A groove or step portion of the pressure vessel cover and/or the cylindrical side wall of the pressure vessel body define a first annular space when the vessel body is placed around the vessel cover plug. This annular space is for receiving an O-ring or the like for providing a pressure seal between the cover plug and the body when pressurized.

A quick securing means for the cover and body comprise facing grooves in the outer cylindrical surface of the cover plug and in the inner cylindrical surface of the side walls of the body. The grooves are arranged to align and define a second annular space. Preferably the annular space is toroidal. An opening through the cylindrical walls of the pressure vessel body communicates with the annular groove in the inner cylindrical wall of the pressure vessel body. A flexible element, preferably a coiled spring, may be inserted through the opening and into the second annular space thus securing the cover and body together. Preferably according to this invention, the second annular space has a circular cross section. It is further preferred according to this invention that apparatus for locking the flexible means in place after it has been inserted into the second annular space, be provided. It is a fact however that as soon as the vessel is pressurized, the shear forces upon the flexible means prevent the withdrawal of the flexible means from the second annular space.

A preferred embodiment of this invention includes a conduit in communication with the opening through the side wall of the pressure vessel extending outwardly of the platform. Thus it is possible for the flexible means to thread into the annular space without the operator bending and reaching under the platform. Preferably the opening in the side wall of the vessel which is in communication with the second annular space is arranged to enter the annular space more or less tangentially. According to a specific embodiment of this invention, the flexible means has a handle on one end thereof and the handle has arranged therewith apparatus for locking engagement with the rigid conduit through which the flexible means is fed into the second annular space. The handle may include a detent groove whereby a quick disconnect sleeve and ball structure secured to the rigid conduit may lockingly engage the handle.

THE DRAWINGS

DESCRIPTION OF THE PREFERRED EMBODIMENTS

Figure 1:
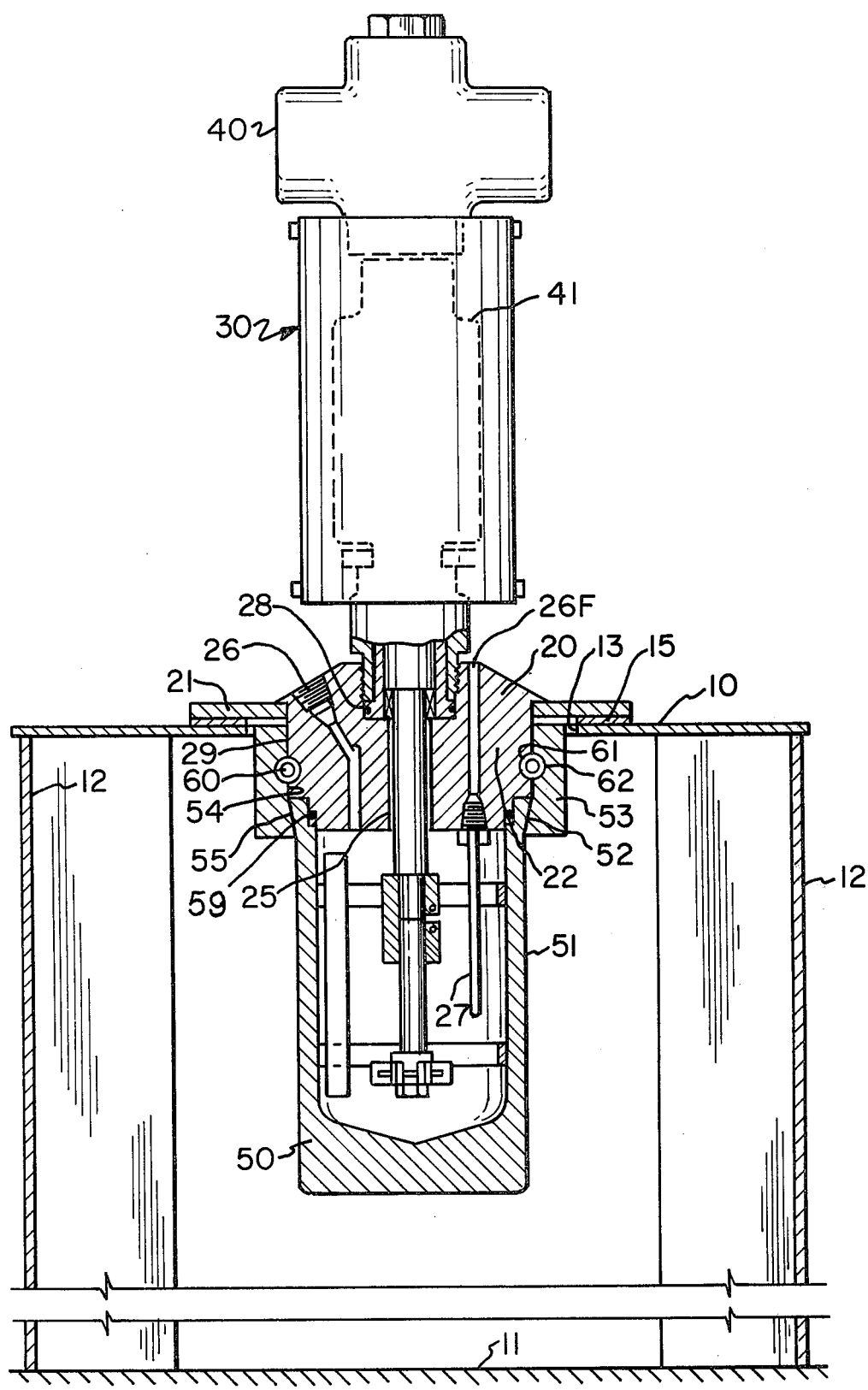
FIG. 1 is a side view of the laboratory pressure vessel according to this invention with a portion thereof shown in section.
Figure 2:
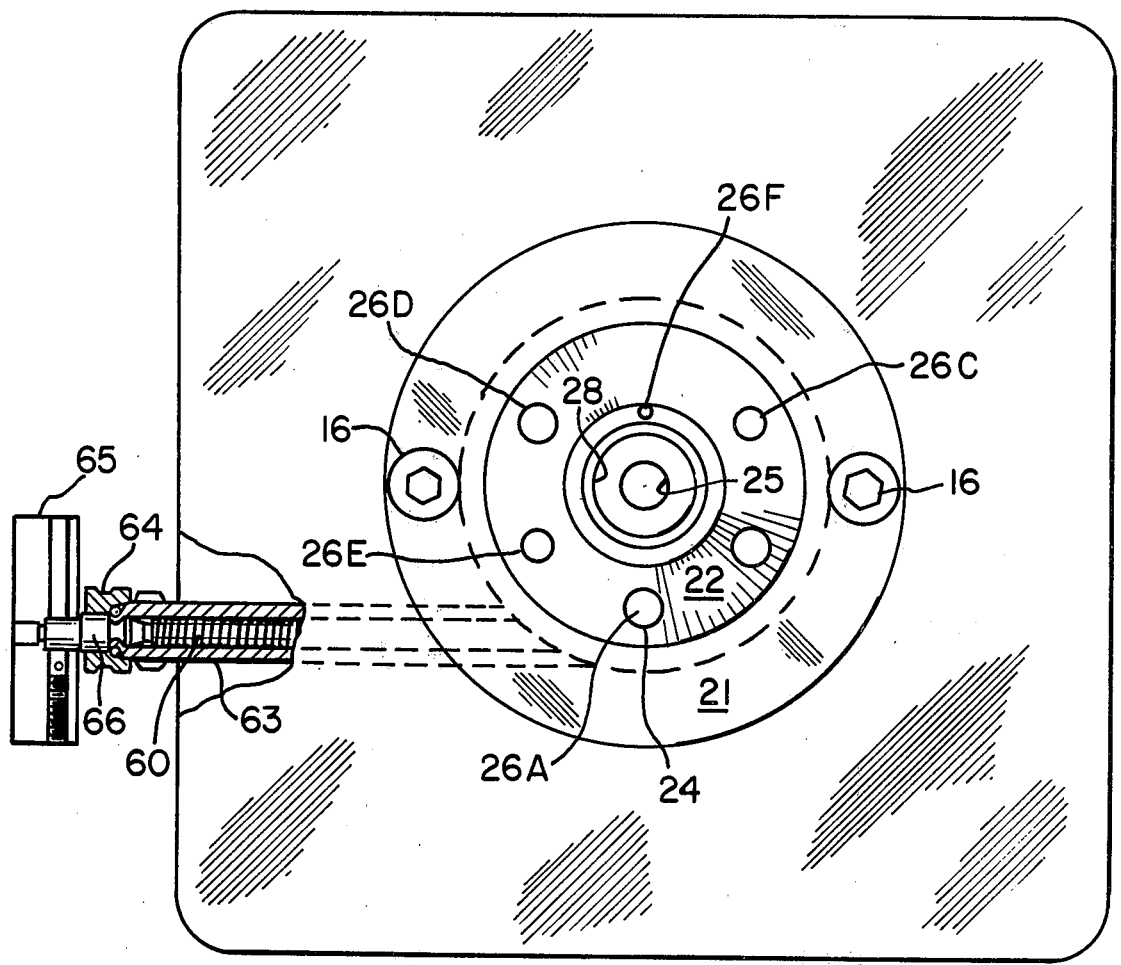
FIG. 2 is a top view of the laboratory pressure vessel according to this invention with the magnetic drive for the mechanical stirring removed and with a portion of the apparatus shown in broken out section.

Referring now to FIG. 1, there is illustrated an autoclave apparatus comprising a platform 10 supported above the floor 11 by side panels or standards 12. The platform 10 supports a pressure vessel cover 20 with attached magnetic drive assembly 30 and air motor 40. Below the platform 10 a pressure vessel body 50 is secured to the vessel cover 20 by a quick securing means comprising a flexible element; namely, a coil spring 60. The platform has a large opening 13. The cover 20 of the pressure vessel has a cover mounting plate 21 secured to the periphery of the cover plug 22. The cover plug 22 enters the large opening 13 in the platform and the covering mounting plate 21 rests upon the upper surface of the platform. Preferably a gasket 15 of asbestos insulates the cover plate from the platform. Bolts 16 (see FIG. 2) hold the cover plate to the platform.

The cover comprises a massive plug 22 which has outer cylindrical side walls extending downwardly. The cover plug has a number of bores therein. It has a central bore 25 through which an impeller drive shaft passes. The cover plug has addiitonal utility bores which may be sealed if not used. These bores 26a, 26b, 26c, 26d, and 26e may provide attachment for conduits that communicate with the interior of the pressure vessel for pressurizing or exhausting the vessel or for connecting the interior of the vessel to a pressure gauge. Moreover, safety diaphragms may be mounted in the bores. One straight through bore 26f has mounted at the bottom side thereof a thermowell 27 into which a temperature sensing device such as a thermocouple may be placed.

The cover plug 22 has on the upper face an internally threaded well 28, which well is threaded near the top but not near the bottom. Mounted in the well is the magnetic drive assembly. The magnetic drive assembly may preferably have many of the features of the magnetic drive disclosed in my U.S. Pat. Nos. 2,996,363 and 4,106,825.

Figure 3:
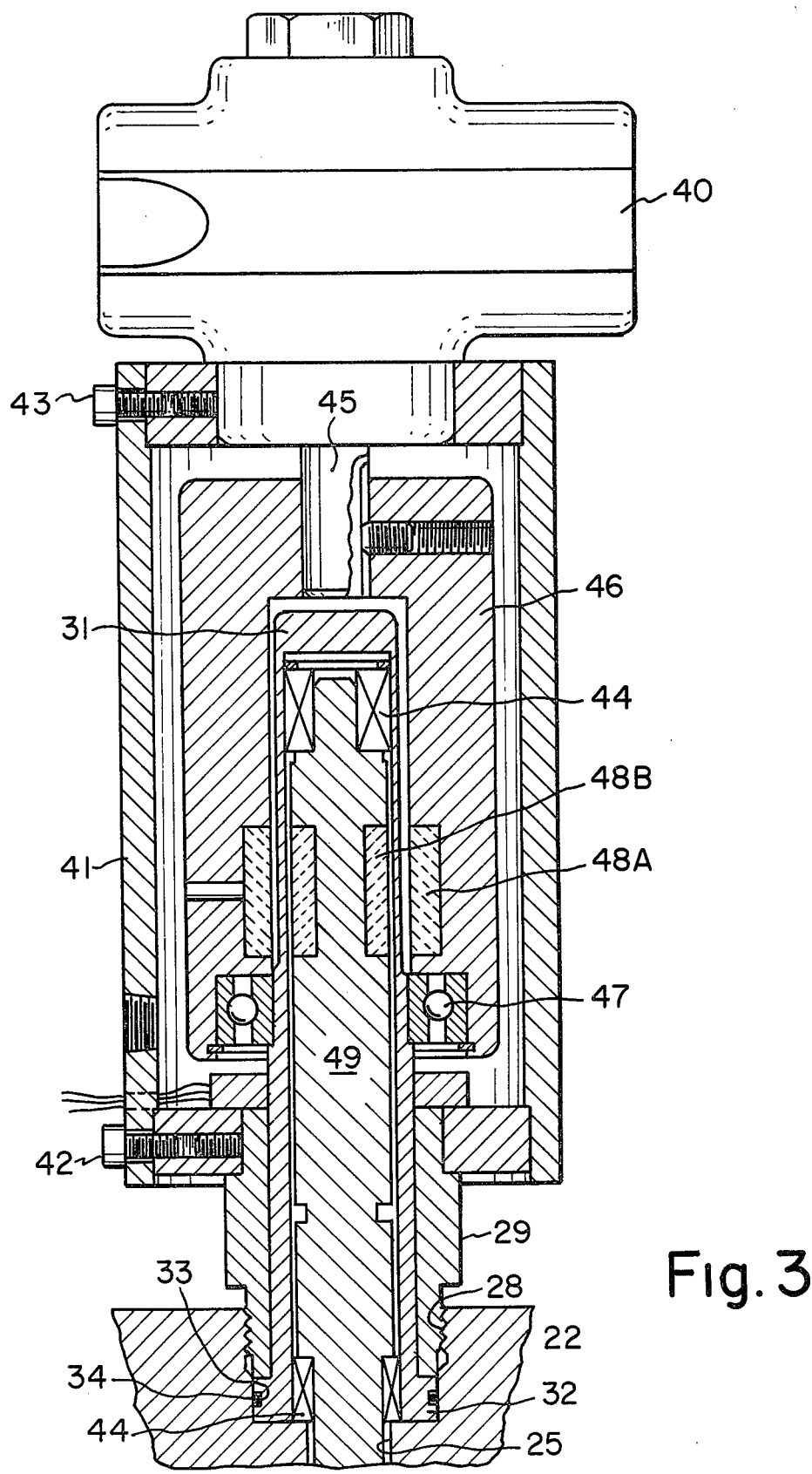
FIG. 3 is a section view through a portion of the cover plug of the laboratory pressure vessel according to this invention and the magnetic drive for providing mechanical agitation.

Referring now to FIG. 3, the plug 22 is shown in section along with the central bore 25 and threaded well 28 already discussed. The central bore and threaded well are coaxial. An elongate cylindrical nonmagnetic drive housing 31 is fabricated from stainless steel or the like. It must be designed to contain the maximum vessel pressure as the interior of the housing is in direct communication with the interior of the pressure vessel. The housing has a cylindrical flange 32 at the base thereof for centering the housing in the bottom of the threaded well 28. A cylindrical groove 33 is provided on the outer cylindrical surface of the cylindrical flange 32 for holding an O-ring 34 or the like. The O-ring may be of a material sold under the trade name VITON or the like. Note that the O-ring 34 in the cylindrical groove 33 bears against the unthreaded cylindrical surface of the threaded well 28. A gland and support base 29 with external threads slides over the drive housing 31 and threads into the threaded well 28, to hold the drive housing securely in place and to provide a base for the motor support structure next described.

An aluminum canister 41 is mounted to the gland and support base 29 radially outward of the drive housing 31 and is fixed relative thereto. The principal function of the canister is to provide a nonrotating base for supporting the air motor 40. Note that the canister is secured to the gland 29 by cap screws 42. The motor 40 is secured to the canister by caps screws 43. The motor drive shaft 45 extends downwardly from the motor. A drive magnet assembly 46 is rotably mounted about the drive housing 31 by bearings 47. The drive shaft 45 is coupled to the drive magnet assembly 46. The drive magnet assembly 46 has mounted therein drive magnets 48A.

Journaled within the drive housing is the driven magnet assembly 49 with driven magnets 48B mounted thereon. The driven magnet assembly is secured in place by radial and thrust bearings 44. When the drive magnet assembly 46 is turned, the driven magnet assembly 49 follows.

The pressure vessel body 50 comprises cylindrical side walls 51 which flare outwardly at the top to form a conical seat 52. A body ring guide tube 53 has a generally annular shape with an annular cylindrical surface for sliding onto the downwardly extending outer cylindrical surface of cover plug 22. The inner surface of the body ring flares inwardly near the bottom to form a conical seat 55 which receives the conical seat 52 of the plug. The upper inside of the cylindrical side walls 51 of the vessel body 50 slide over the lower end of the plug 22. Together the plug and the side walls define a first annular space in which an O-ring 59 is placed to seal the vessel when it is pressurized.

The plug 22 has a groove 61 on the outer cylindrical surface which with the facing groove 62 on the inner cylindrical surface of the body ring defines a toroidal space. An entry bore through the body ring opens into the groove 62. The bore is arranged to intersect the toroidal space more or less tangent thereto. Extending away from the entry bore is a conduit 63 coaxial therewith and having the approximate same inner diameter as the diameter of the bore. The length of the conduit is variable but preferably extends from the vessel to near the outer edge of the platform 10. The outer end of the conduit 63 has mounted thereon a quick disconnect sleeve 64.

When the vessel is ready to be closed, it is raised up around the plug. The flexible element, say a coil spring 60, is inserted in the toroidal space through the conduit 63. The length of the coil spring must be the total of the length of the circumference of the toroidal space, plus the length of the bore in the side wall leading to the toroidal space plus the length of the conduit 63. Preferably the coil spring has a handle 65 fixed to one end having a shaft 66 extending from the spring. The shaft 66 has detents thereon for cooperating with the quick disconnect sleeve 64 secured to the end of the conduit 63. The quick disconnect is a typical type involving a shiftable sleeve which positions ball bearings for engaging the detent on the other member. Thus, once the coil spring has been inserted and the quick disconnect snapped into the locking position, the coil spring cannot be withdrawn without the very deliberate action of moving the quick disconnect sleeves 64. In any event, once the vessel is pressurized, the shear forces upon the flexible element or coil springs will prevent it from being withdrawn.

The flexible element 60, if a coil spring for example, should have an outer diameter just less than the inner diameter of the toroidal space defined by the grooves in the plug 22 and the body. The coil spring must be of sufficiently heavy and strong material to withstand the shearing forces applied to it when the vessel is pressurized. Securing devices of this general type have been proposed in the prior art. See, for example, German Patent 946,580.

The structural features of the apparatus that result in unique advantages of this invention are related to the fact that the cover is not removed from a stationary vessel but rather the cover or plug is hung and the vessel is moved up and down to the cover. Also, the advantages of this invention flow from the rapid securement of the vessel to the plug via the flexible element in the toroidal space defined by the facing grooves in the cover and vessel walls respectively. Hence the utilities can be permanently fixed to the cover. This would not be possible if the cover were threaded into a stationary vessel or if a reaction frame were used to hold the cover of the vessel. With reaction frames, the ends of the vessel must be free of apparatus for receiving the frame.

Having thus described the invention with the detail and particularity required by the Patent Laws, what is desired protected by Letters Patent is set forth in the following claims.

I claim:

1. A laboratory pressure vessel comprising
   a normally stationary platform,
   means for supporting the platform above the surface upon which the supporting means rests,
   a pressure vessel cover fixedly secured to the platform and having a portion extending downwardly below the platform, said cover having utility passages therein,
   a pressure vessel body comprising a cylindrical side wall and a bottom, said body having an open end arranged to fit over the portion of the pressure vessel cover extending downwardly below the platform, grooves in said cover and/or vessel body defining a first annular space for receiving a means for sealing said cover to said vessel body, said pressure vessel body having no openings through the side wall below the said first annular space,
   a quick securing means comprising facing channels in the pressure vessel cover and pressure vessel body between the facing cylindrical surfaces thereof and located above said first annular space, which facing channels define a second annular space, an opening through the cylindrical side wall of the body outwardly of the second annular space and in open communication therewith, flexible means for inserting through said body side wall opening and filling said second annular space thereby holding the cover and vessel body together.

2. The laboratory pressure vessel according to claim 1 having means for locking the flexible means in place after it has been inserted in the second annular space.

3. The laboratory pressure vessel according to claim 1 wherein said second annular space has a substantially circular cross section with approximately one semi-circle grooved out of each of the cover and body.

4. The laboratory pressure vessel according to claim 3 wherein the flexible means is a coil spring.

5. The laboratory pressure vessel according to claim 1 in which a rigid conduit extends from the opening in the cylindrical side wall of the body outwardly to an outer edge of said platform, the inner diameter of the conduit being large enough to receive the flexible means whereby the flexible means can be placed through said rigid conduit into the second annular space.

6. The laboratory pressure vessel according to claim 5 in which the flexible means has a handle on one end thereof and the handle has means for locking engagement with the rigid conduit when the flexible means has been inserted in the second annular space.

7. The laboratory pressure vessel according to claim 5 in which the means for locking is a quick disconnect means.

* * * * *